United States Patent [19]

Lo et al.

[11] Patent Number: 4,933,967

[45] Date of Patent: Jun. 12, 1990

[54] AUTOMATICALLY-EFFECTED MOVE OF A SUBSCRIBER BETWEEN ELECTRONIC MESSAGE SERVICE SYSTEMS IN A NETWORK

[75] Inventors: Stella Y. Lo, Boulder; John R. Lothrop, Longmont; Steven G. Spearman, Westminster, all of Colo.; Mary L. Warren, Tinton Falls, N.J.

[73] Assignee: AT&T Company, New York, N.Y.

[21] Appl. No.: 359,828

[22] Filed: Jun. 1, 1989

[51] Int. Cl.⁵ .................. H04M 3/50; H04M 7/00
[52] U.S. Cl. .................................. 379/207; 379/89; 379/94; 379/245
[58] Field of Search .............. 379/207, 201, 88, 89, 379/93, 94, 97, 211, 245, 246

[56] References Cited

U.S. PATENT DOCUMENTS

| | | | |
|---|---|---|---|
| 4,602,129 | 7/1986 | Matthews et al. | 379/88 |
| 4,646,346 | 2/1987 | Emerson et al. | 379/214 |
| 4,723,272 | 2/1988 | Maat | 379/211 |
| 4,754,479 | 6/1988 | Bicknell et al. | 379/207 |
| 4,790,003 | 12/1988 | Kepley et al. | 379/88 |

Primary Examiner—Thomas W. Brown
Attorney, Agent, or Firm—David Volejnicek

[57] ABSTRACT

In a network (10) of voice-mail message service systems (12–14), each system includes an arrangement (22) for automatically moving the serving of one or more subscribers from itself to another system. In response to administrator (29) input, the source system retrieves each moving subscriber's mailbox (200) contents, translates subscriber I.D.s appearing therein into universal names and extension numbers, and transfers the translated contents, including delivery lists (222) and messages (211), to the destination system. The destination system creates a new mailbox for each moved subscriber, translates the universal information into subscriber I.D.s, and populates the new mailbox with the transferred contents. The source system informs third systems of the move, so they can update their information. During audits, the source and destination systems search their databases to find any information affected by the move and update it; the source system also deletes the moved subscribers' old mailboxes.

27 Claims, 8 Drawing Sheets

AUTOMATICALLY-EFFECTED MOVE OF A SUBSCRIBER BETWEEN ELECTRONIC MESSAGE SERVICE SYSTEMS IN A NETWORK

TECHNICAL FIELD

This invention generally relates to networking of electronic message systems, and specifically relates to the moving of subscribers for service from one system to another.

BACKGROUND OF THE INVENTION

Networking of electronic message service systems, such as voice-mail message service systems, is known. An example thereof is disclosed in U.S. Pat. No. 4,790,003. Networking provides subscribers of the messaging service who are served by one system to send messages to and receive messages from subscribers of the service who are served by other systems.

When a service provider expands the network by adding one or more message systems thereto to serve subscribers hitherto served by another, possibly overloaded, system, or when one or more service subscribers move from a location served by one system to a location served by another system, subscribers must be "moved" from one system to the other. That is, the system which is to serve the subscribers must be made aware of the fact that it is to serve them and must be provided with information required to serve them, while the system which has been serving the subscriber must be made aware that it is no longer to do so, and other systems in the network must be appraised of the fact that the subscribers' service location within the network has changed.

The presently-used method of "moving" subscribers from one voice-mail message service system to another is cumbersome for system administrators, and moves only a minimal amount of information. Essentially, it requires deletion of each moving subscriber from the network, followed by addition of each moving subscriber to the network as a new subscriber. The administrator of the system that is presently serving the moving subscribers manually deletes information about each moving subscriber from the system, as if that subscriber had ceased subscribing to the service, and notifies the other systems to do the same. The administrator of the system that is to serve the moving subscribers then manually enters information about each moving subscriber into the system, as if he or she were adding a new subscriber, and notifies other systems of the addition. Thus, the administrator of the subscribers' new serving system must re-enter all of the information that had in the past been entered by the administrator of the subscribers' old serving system. And in the process of deleting the subscribers from the old serving system, the contents of their mailboxes, e.g., all address lists and stored messages, are lost, and the moved/deleted subscribers are deleted from address lists of the remaining subscribers on the old serving system.

A move of subscribers from one text mail system to another is often not as inconvenient: the administrator of the subscribers' new serving system manually enters information about the moving subscribers into the system to create accounts for them on the new serving system, and then manually initiates an electronic transfer of all data files pertaining to the moving subscribers from the old serving system to the new serving system, after which the administrator of the old serving system manually deletes the accounts of the moving subscribers from the old serving system. The administrators also notify other systems in the network of the move so that the other systems can update their addressing information on the moved subscribers.

While this approach does not result in the loss of the moved subscribers' data files, it still requires a substantial amount of work to be done by the system administrators in order to effect the move. Furthermore, this move mechanism is facilitated by the fact that, in many text-based mail systems, a subscriber may have the same identifier, e.g., a login, for a plurality of mailboxes one on each of a plurality of systems, and that identifier is considered by each such system to be purely local. In contrast, in other systems, such as voice-mail systems, a subscriber's identifier, e.g., an extension number, is generally universal to the whole network, and hence cannot be used to uniquely identify a plurality of mailboxes. Hence, in the above-characterized many text-based systems, information may be transferred from one mailbox to another using the same identifier, but this is not readily possible in the above-characterized other systems. Consequently, an attempt to use this approach in the context of the other systems would generally result in much cumbersome manipulation by system administrators, such as assigning temporary identifiers to mailboxes for the duration of a move, and then re-identifying the mailboxes.

A further problem exists on account of destination lists. These are lists of addresses which a subscriber keeps so that he or she may address and mail a message to those addresses by specifying the list name instead of having to specify each and every address on the list. These lists are not moved in the presently-used method of "moving" subscribers between voice-mail message service systems; hence, they are lost and must be re-created. And while such lists may not be lost in the above-described text-mail method of moving subscribers between systems, their contents are affected by moves, and hence the lists must be updated following a move in order to remain valid. But no approach to updating the lists, other than each list owner reviewing each list's contents and manually changing outdated ones, has hitherto been available.

SUMMARY OF THE INVENTION

This invention is directed to solving these and other disadvantages of the prior art. According to the invention, moving of electronic messaging service subscribers for service among networked electronic message service systems is accomplished automatically by the systems themselves. Each of the systems includes an arrangement for effecting a move. The system from which at least one subscriber is to be moved (the source system) receives input, e.g., from the system administrator, identifying the at least one moving subscriber and the system to which the subscriber is moving (the destination system). In response, the arrangement in that source system automatically communicates to the destination system information required to serve the moving subscriber, i.e., the subscriber profile information. Preferably, the communicated information is the contents of the moving subscriber's mailbox, and includes not only the subscriber profile information, but also address lists, personal greetings, and messages that are stored therein. The arrangement of the source system also automatically notifies other systems in the network of the move.

The arrangement of the destination system receives the communicated information, and in response automatically commences to serve the moving subscriber on the destination system. Illustratively, this involves setting up a new mailbox for the subscriber in the destination system and populating it with the received contents of the old mailbox. The subscriber's old mailbox is eventually automatically deleted, after the new mailbox in the destination system is successfully created and requisite information is transferred to it.

The invention provides a system administrator with an automated way of moving subscribers from one message system to another. Not only subscriber profile information, which is requisite for serving a subscriber, but also subscriber messages can be included in the moved information. The feature automates and simplifies the administrative procedures involved in the move. The administrator can specify a whole list of subscribers to move instead of effecting each subscribers' move individually, the administrator can schedule a move to occur automatically at a particular time, and the administrator does not need to re-enter and re-record already-extant information for the moving subscribers. Administrators are relieved of effecting the move manually; the move is effected by the systems automatically. Furthermore, the administrator of only the system from which the subscribers are moving can effect the move; administrators of the other systems need not be involved.

As was mentioned previously, the subscriber's move may affect information, such as addressing information associated with messages or included in address lists, in both the source and destination systems as well as in other systems in the network. Therefore, in response to the move, the arrangement in each system automatically searches through information maintained on its system for information affected by the move, and updates that information. This relieves individual subscribers of the effort of having to keep informed of all subscriber moves in the network and then reviewing all of their information and manually modifying that information which is effected by those moves, in order to keep all of their information accurate and up to date.

In an illustrative network of electronic message service systems, certain subscriber addressing information, such as subscriber name and extension number, is universal across the network, but references to subscribers on each system are made by way of local, system-specific, subscriber I.D.s, and each system keeps correlations, e.g., a translation table, between the local and universal information. In such a network, the source system translates the local information appearing in the moving subscriber's old mailbox contents into the universal information prior to sending the contents to the destination system, and the destination system translates the universal information in the received contents into its own local information. Inability of the destination system to translate any information may be treated, at the system administrator's option, in one of two ways: either the move is aborted, or the untranslatable information is deleted and the move is forced to proceed.

Also in such a network, updating each system's database to reflect the move may be done simply, merely by modifying the universal information in the translation table of correlations between local and universal information. However, if a move of a subscriber requires assignment to the moved subscriber of a new subscriber I.D., for example, because each system has a range of subscriber I.D.s reserved for subscribers that is serving and uses a different range of subscriber I.D.s for subscribers served by other systems, then the arrangements in the source and destination systems search through their respective system's database for all possible occurrences of the moved subscriber's I.D. and change them. As this is a time-consuming process, it is typically carried out at a time of low system use, for example, as part of system audits. As a consequence, normal system operation is not disrupted thereby.

These and other features and advantages of the invention will become more apparent from the following description of an illustrative embodiment of the invention considered together with the drawing.

DETAILED DESCRIPTION

Figure 1:
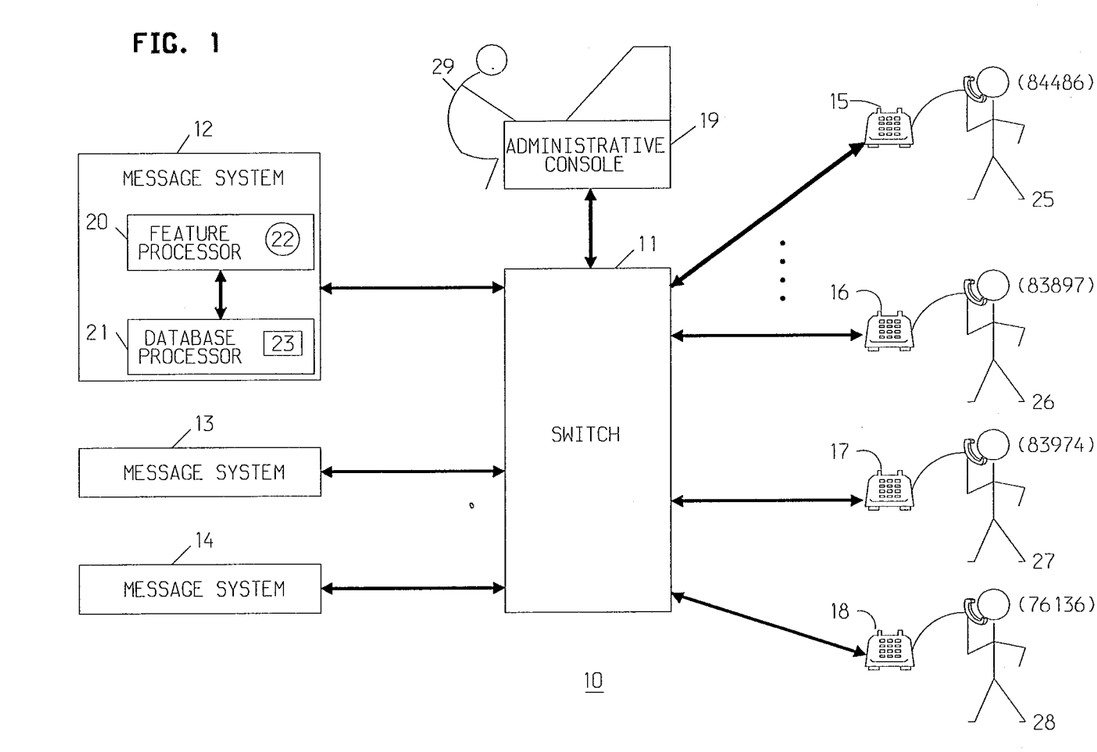
FIG. 1 is a block diagram of an illustrative electronic message service network embodying an illustrative example of the invention.

FIG. 1 shows in block form an illustrative network 10 of voice-mail message service systems. The network is a conventional digital network as described in U.S. Pat. No. 4,790,003. Illustratively, the network uses the CCITT X .400 protocol to effect information transfers between systems within the network. For purposes of this description, network 10 comprises a plurality of voice-mail message service systems 12-14 interconnected for communication with each other and with a plurality of messaging service subscribers' terminals 15-18 by a switch 11. Each system 12-14 is illustratively the AT&T AUDIX system. Switch 11 is illustratively the AT&T Definity ™ private branch exchange (PBX) along with any interface equipment required to effect digital networking between systems 12-14, as described in the above-mentioned patent. Switch 11 also provides access to systems 12-14 for non-subscribers of the messaging service, so that they can leave messages therein for subscribers 25-28, and for an administrator 19 of systems 12-14.

Each subscriber 25-28, i.e., his or her associated terminal 15-18, within the network of FIG. 1 are assigned a unique at least one extension number. In FIG. 1, illustrative extension numbers are shown in parentheses next to subscribers 25-28 to whom they are assigned. Each subscriber 25-28 is also assigned to one of the systems 12-14 to be served thereby. Illustratively, subscribers 25-26 are assigned to system 12, subscriber 27 is assigned to system 13, and subscriber 28 is assigned to system 14. These assignments are known both to systems 12-14 and to switch 11. Switch 11 provides interconnection between in-calling non-subscribers, subscribers' terminals 15-18, and systems 12-14 in accordance with those assignments, in a conventional manner.

Each system 12-14 includes, inter alia, a feature processor 20 and a database processor 21, as described in the U.S. patent referred to above and illustratively shown for system 12 in FIG. 1. Database processor 23 includes a database memory 23—typically a disk—whose contents relevant to this discussion are shown in FIG. 2.

Figure 2:
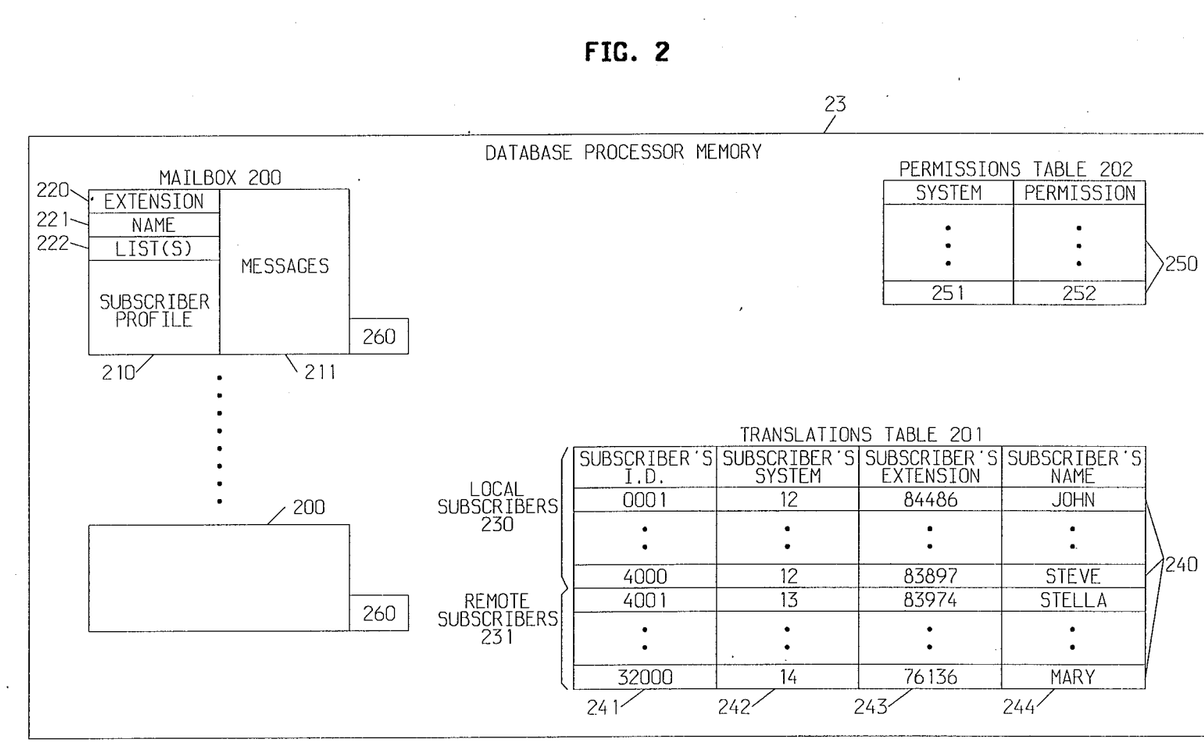
FIG. 2 is a block diagram of the memory of the database processor of a message system of the network of FIG. 1.

As shown in FIG. 2, each system 12-14 includes a plurality of subscriber mailboxes 200, one for each extension number served by that system 12-14. If a subscriber 25-28 has more than one associated extension number, he or she has a mailbox 200 for each extension, on the same one or on different ones of the systems 12-14. Each extension number is treated by systems 12-14 as a different subscriber 25-28. Each mailbox 200 effectively comprises two parts 210 and 211. Subscriber profile 210 includes fields of information that define the associated subscriber and the services he or she is entitled to, such as subscriber extension 220, subscriber name 221, distribution/addressee list(s) 222, class-of-service, password, switch number, community I.D., recorded voice name, covering extensions, etc. Messages 211 include incoming voice messages received for the associated subscriber 25-28 and outgoing messages sent and saved, or scheduled to be sent, from the associated subscriber 25-28. Mailboxes 200 and their contents are conventional.

Internally, each system 12-14 refers to subscribers 25-28 by subscriber I.D.s. Each subscriber 25-28 has a unique I.D. in the system 12-14 to which he or she is assigned for service. Additionally, a subscriber may have an I.D. on any one or more of the other systems 12-14; typically because either a message for this subscriber 25-28 has been generated on this system 12-14, or a message from this subscriber 25-28 has been received on this system 12-14, or the subscriber's name appears on an addressee list 222 in this system 12-14, or simply because every system 12-14 is keeping records on every subscriber 25-28 within network 10. A subscriber's I.D. on any one system 12-14 is generally—though it need not be—different from that subscriber's I.D. on any other system 12-14, because each system 12-14 makes assignments of subscriber I.D.s independently of other systems 12-14.

For purposes of correlating subscriber I.D.s with subscribers 25-28, each system 12-14 includes a conventional translation table 201. Table 201 includes a plurality of entries 240, one for each I.D.-to-subscriber correlation. Each entry 240 includes a plurality of fields 241-242. Field 241 contains the subscriber I.D., field 242 identifies the one of the systems 12-14 which is serving the subscriber, field 243 contains the subscriber's extension, and field 244 contains the subscriber's name. Table 201 is divided into two sections: local subscribers section 230 contains entries 240 correlating I.D.s with subscribers 25-28 served by this system 12-14, while remote subscribers section 231 contains entries 240 correlating I.D.s with subscribers 25-28 served by other systems 12-14. Local subscribers are assigned I.D.s from a certain range of subscriber I.D. numbers, illustratively from 0001 to 4000, while remote subscribers are assigned I.D.s from a different range of subscriber I.D. numbers, illustratively from 4001 to 32000.

According to this invention, each system 12-14 also stores a subscriber move function 22 in memory of its feature processor 20. Wwhen a subscriber move is to be effected, administrator 29 invokes function 22 on the one system 12-14 from which a move is to be effected, referred to as the source system. Function 22 is then executed on feature processor 20 of the source system. Function 22 of the other systems 12-14 in network 10 is then invoked automatically by operation of function 22 on the source system. The operation of function 22 is shown in flowchart form in FIGS. 3-8.

Turning to FIGS. 3-8, assume a move of subscriber 25 from system 12 to system 13. Upon its invocation on system 12 by administrator 29 from administration console 19, function 22 starts to execute in system 12, at step 300. First, function 22 prompts administrator 29 for information required to effect the move, at step 301, and then awaits receipt of the information, at step 302. Illustratively, the prompts take the form of a template displayed by function 22 on a screen of administration console 19, which requires administrator 29 to fill in the template's blank information fields. The requested information is the extension number or numbers of one of more subscribers 25-26 who are to be moved, and for each moving subscriber 25, the destination system 13-14 to which subscriber 25 is to be moved. Also requested is information about a set of options for each moving subscriber 25, such as the scheduled time for effecting the move, identity of any subscriber-related information that should not be moved (e.g., old messages), whether moving subscriber 25 will have a new extension number on the destination system and what the new extension number is, identification of any new PBX switch that the destination system is connected to, and whether the move is "forced" or "unforced". The options all have default values—for example, effect move immediately, move all information, retain old extension, no new switch, "unforced" move—and hence any or all of the option fields may be left blank.

Figure 3:
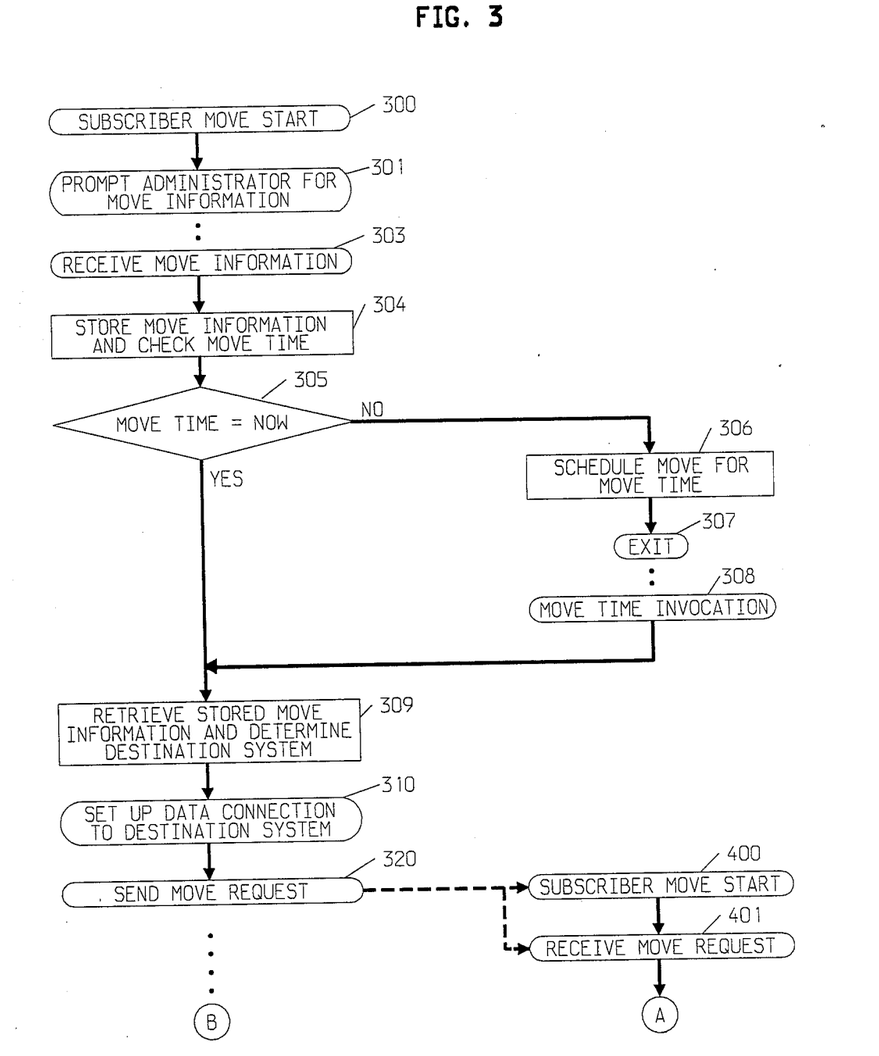
FIGS. 3-8 are a flow diagram of the operations of the subscriber move function of a message system of the network of FIG. 1.
Figure 4:
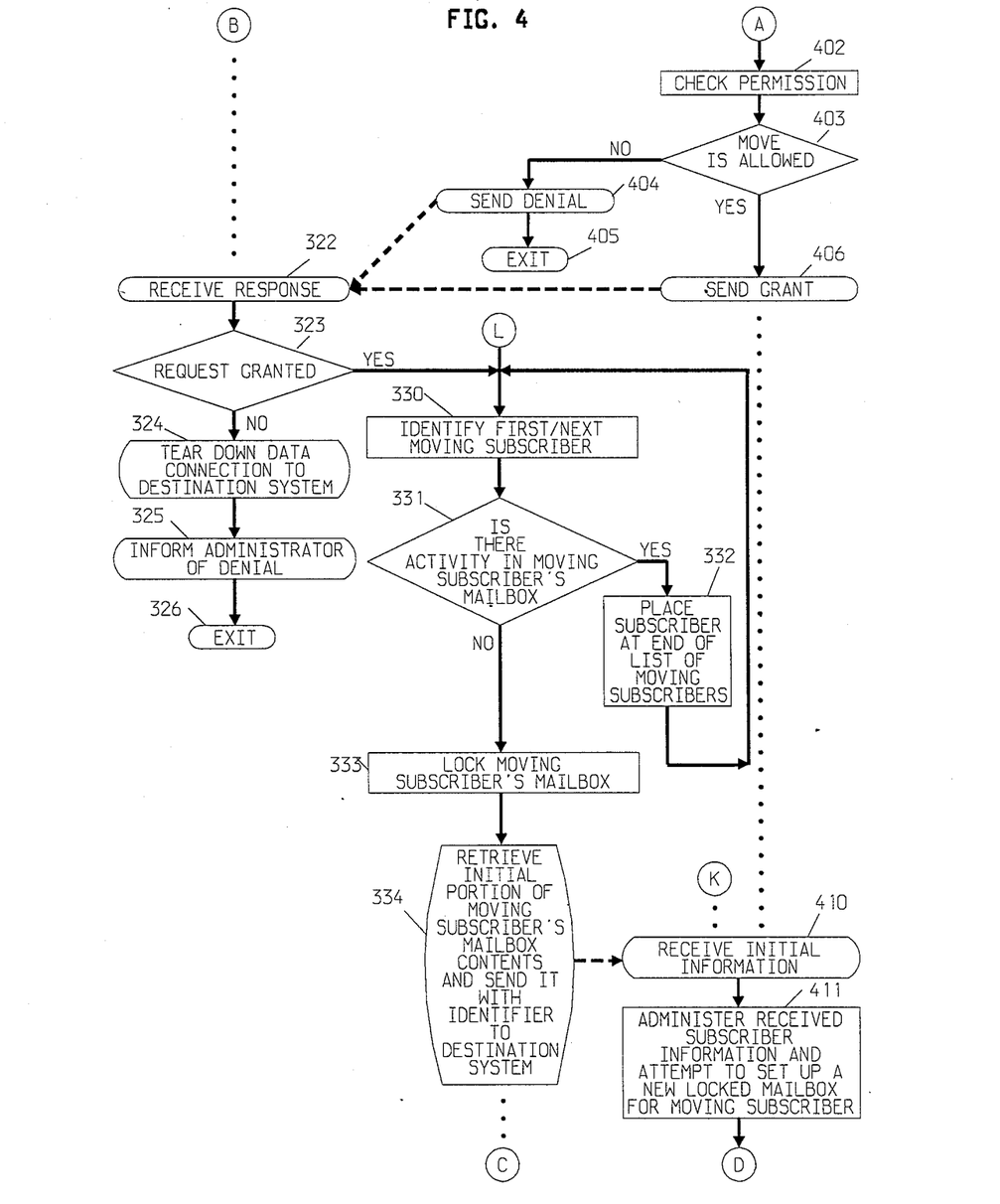
Figure 5:
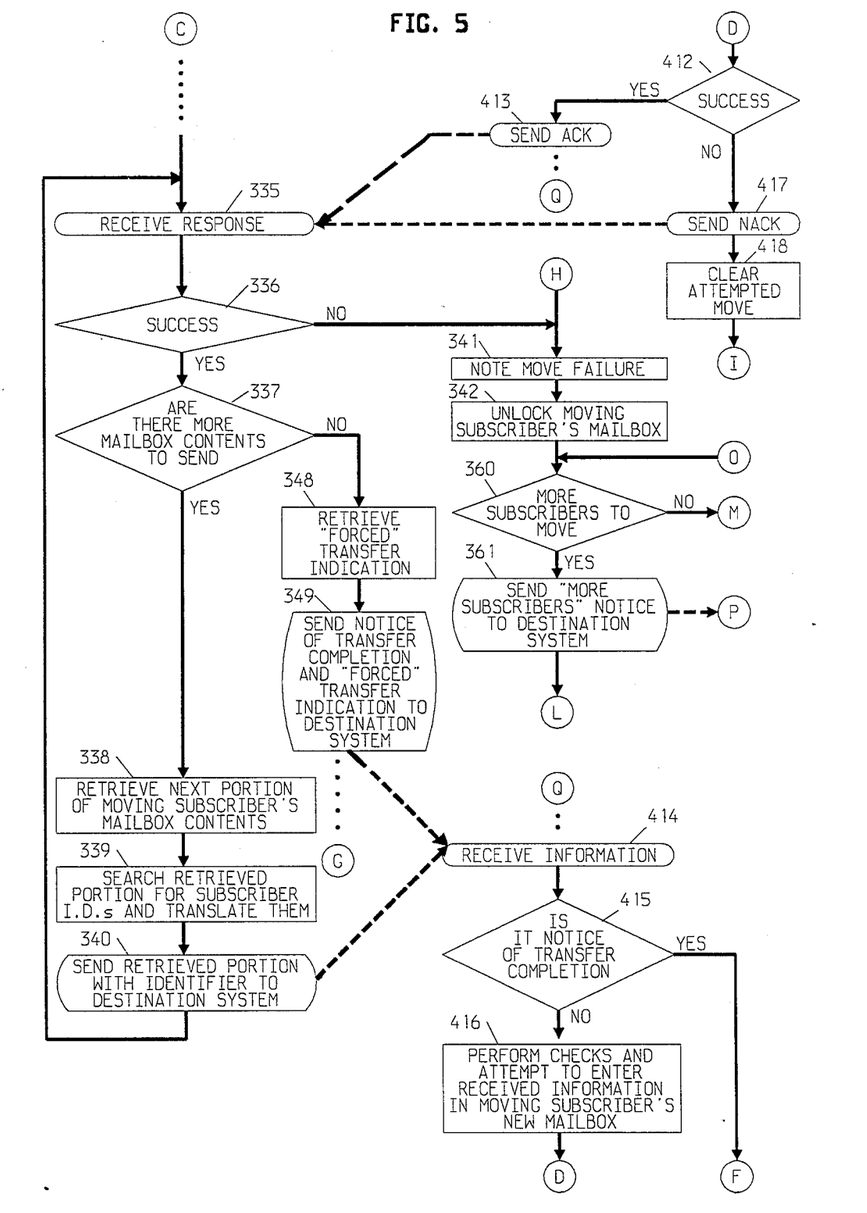
Figure 6:
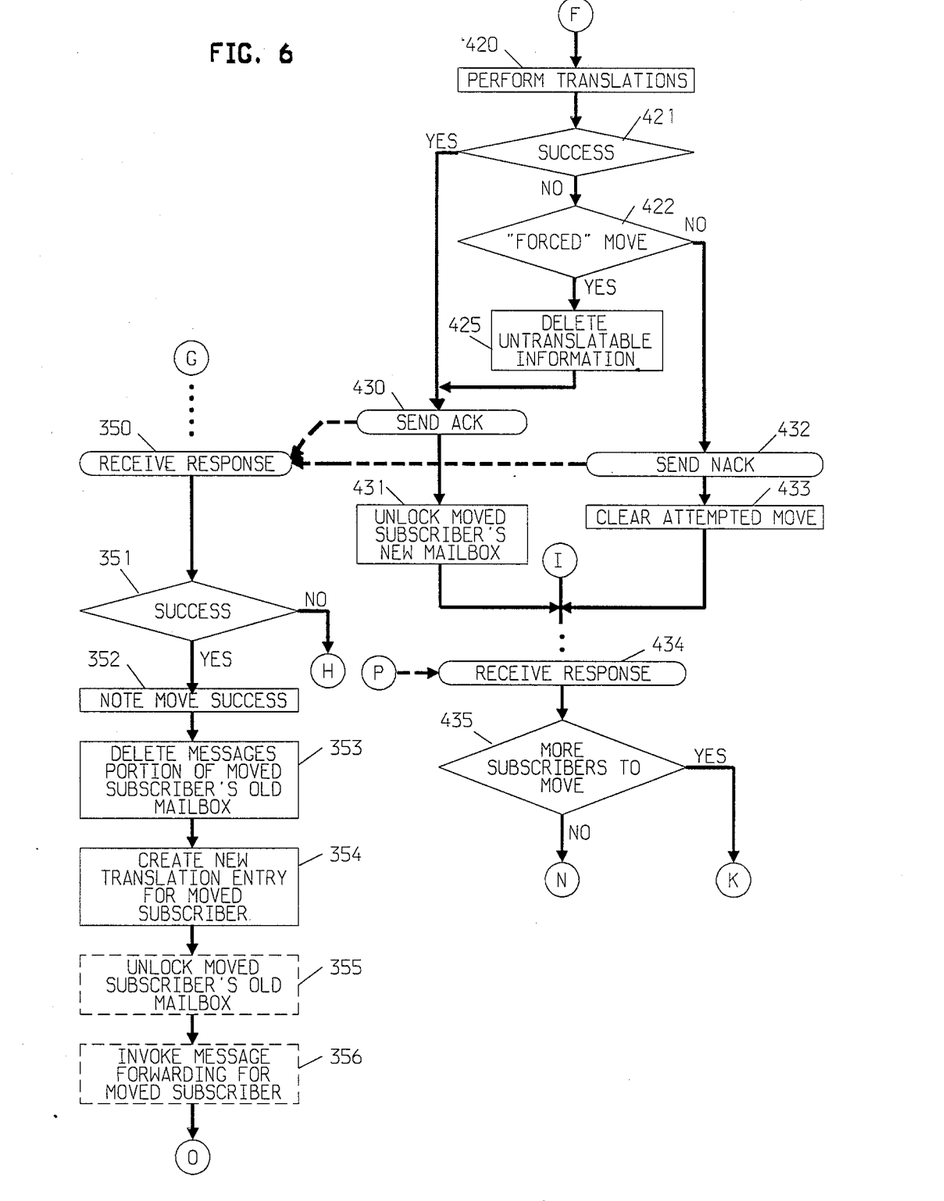
Figure 7:
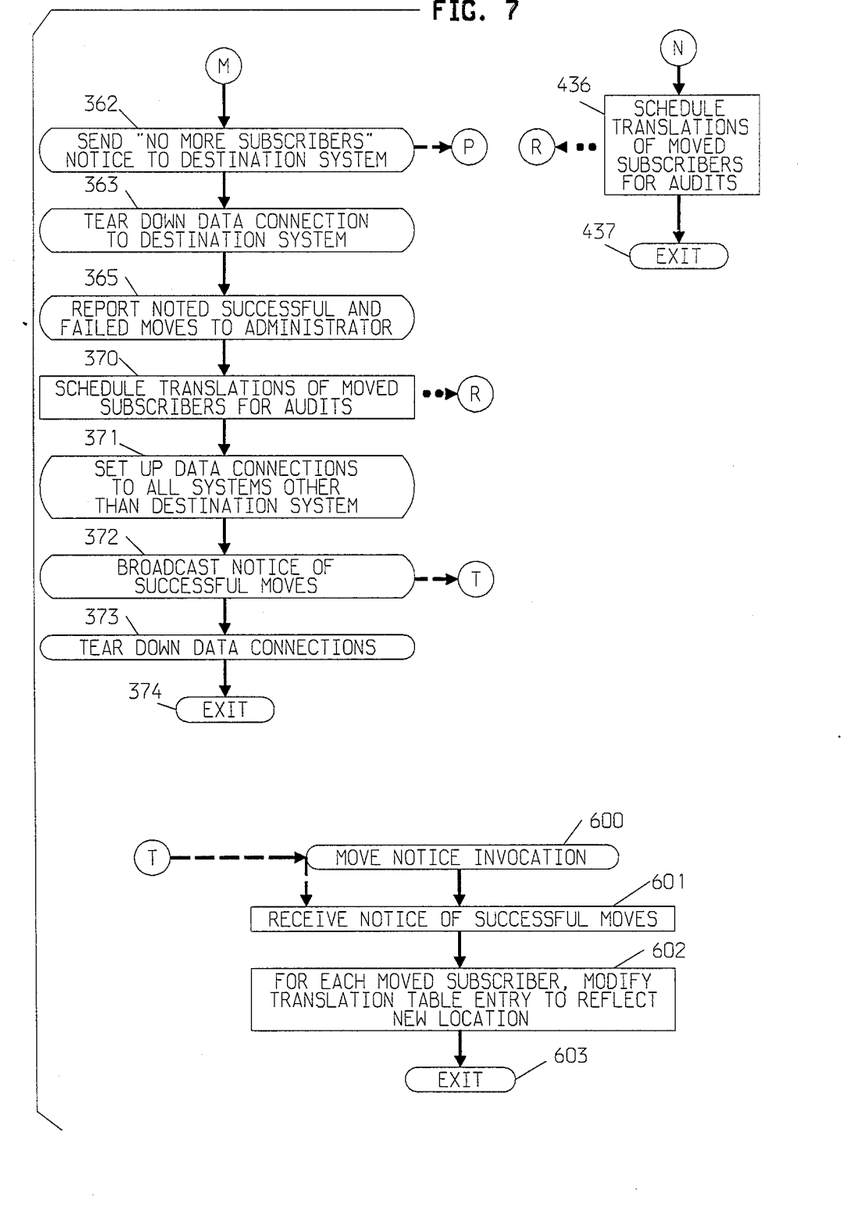
Figure 8:
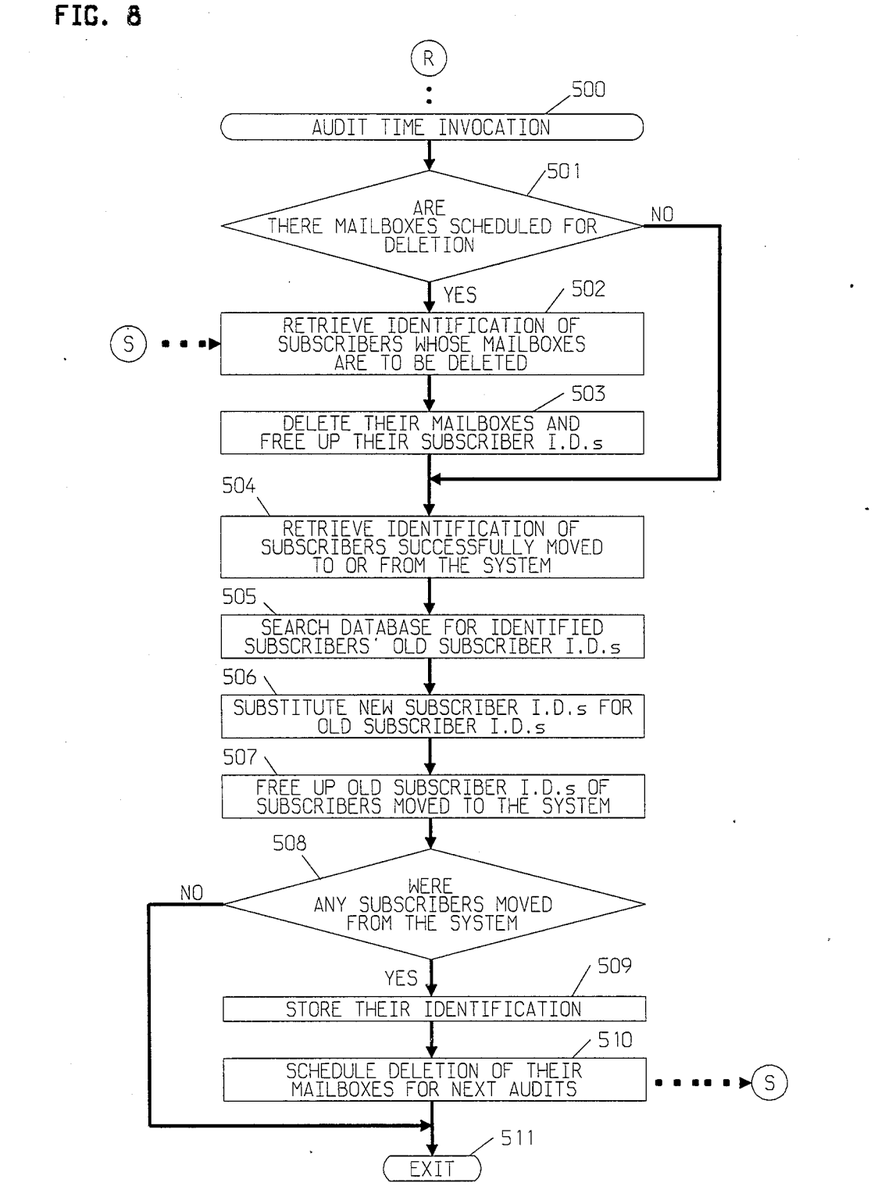

When administrator 29 enters the requested information into system 12, function 22 of system 12 receives it, at step 303, and stores it, at step 304. Optionally at this time, function 22 may retrieve and display on administrative console 19 the names of moving subscribers 25, as a confirmation of receipt of correct information. Function 22 then examines the received information to determine the time for which the move is to be scheduled, at step 305. Typically, a move will be scheduled for a time of low use of network 10—e.g., for late at night—to cause minimum disruption to its operation. If the move is not to be effected immediately, function 22 invokes the conventional scheduling function of system 12 to schedule the move for the desired time, at step 306, and then exits, at step 307, having nothing else to do for the time being. When the scheduled time comes up, function 22 is re-invoked on system 12, in a conventional manner, at step 308.

Upon its re-invocation at step 308, or if it determines at step 305 that the move is to be effected immediately, function 22 of system 12 retrieves the information that it stored at step 305 to determine the identity of the system 13-14 to which a subscriber 25 is being moved, at step 309. Function 22 then causes a data connection to be established from system 12 to the destination system—system 13 in this illustrative example—at step 310. Function 22 of system 12 then sends a request to effect a move over the connection to system 13, at step 320, and awaits a response.

In system 13, receipt of the move request from system 12 results in invocation of its function 22, at step 400, and the received request is passed thereto, at step 401. The received request identifies system 12 that generated the request, and function 22 of system 13 uses this information to check permissions of system 13 for accepting subscriber moves from system 12, at step 402. Turning momentarily to FIG. 2, each system 12-14 includes a table 202 of permissions for this purpose. Table 202 has a plurality of entries 250 each one of which has a field 251 identifying one of the other systems 12-14 and a field 252 indicating whether moves from that system are being accepted. If function 22 of system 13 determines, at step 403, that moves from system 12 are not being accepted, it sends a denial to system 12, at step 404, and then exits, at step 405. If it determines that moves from system 12 are being accepted, it sends a grant, at step 406, and waits for further input.

Function 22 of system 12 receives the response from system 13 to its request, at step 322, and checks whether it is a grant or a denial, at step 323. If it is a denial, function 22 causes the data connection to system 13 that was established at step 310 to be torn down, at step 324, informs administrator 29 that the move failed because it was denied by destination system 13, at step 325, and then exits, at step 326.

If the response from system 13 is a grant of the move request, function 22 of system 12 accesses the information that it stored at step 304 to identify therefrom a moving subscriber, at step 330. Having identified subscriber 25 in this example, function 22 checks whether there is any activity in mailbox 200 of identified subscriber 25, i.e., whether subscriber 25 is presently accessing his or her own mailbox 200, or whether someone is presently leaving a message in that subscriber's mailbox 200, at step 331. If there is mailbox 200 activity, function 22 places the subscriber's identity at the end of a list of moving subscribers, at step 332, and returns to step 330 to identify a next moving subscriber. If no mailbox 200 activity is detected at step 331, function 22 locks mailbox 200 of moving subscriber 25, at step 333, illustratively by setting a locking flag bit 260 (see FIG. 2) associated with that mailbox 200, to prevent mailbox 200 activity from taking place and interfering with the move. Function 22 of system 12 then retrieves an initial portion of the contents of mailbox 200 of moving subscriber 25, and sends it, along with an indication of what the sent contents are, across the established data link to system 13, at step 334, and then awaits a response.

Function 22 of system 13 receives the sent portion of the moving subscriber's mailbox 200 contents, at step 410. This initially sent information includes subscriber 25 profile information 210, such as the subscriber's extension 220 and name 221 (see FIG. 2). Function 22 of system 13 administers the received information as a new subscriber, e.g., it checks for name and extension conflicts, attempts to set up a mailbox 200 for the moving subscriber 25, and creates an entry 240 for moving subscriber 25 in local subscribers portion 230 of translation table 201 of system 13, at step 411. If the administration succeeds, e.g., no conflict is found, and if the attempt to set up a new mailbox 200 also succeeds, as determined at step 412, function 22 of system 13 sends to system 12 a positive acknowledgement (ACK), at step 413.

Function 22 of system 12 receives the responding acknowledgment, at step 335, and checks it, at step 336, to determine if it is a positive or a negative acknowledgment. If it is a positive acknowledgment, function 22 checks old mailbox 200 of moving subscriber 25 to determine if there are more contents to send, at step 337. If so, function 22 retrieves another portion of the contents, at step 338. Content portions subsequent to the initial one may include subscriber I.D.s, which are system-specific, as mentioned above. Function 22 of system 12 therefore searches through the retrieved portion and translates each subscriber I.D. found therein into information that is universal to the network of FIG. 1, at step 339. Specifically, function 22 uses translation table 201 of system 12 to substitute for any subscriber I.D. the contents of fields 242-244 of its corresponding entry 240. Function 22 then sends the translated portion of mailbox 200 contents, along with an identifier of what the contents are, to system 13, at step 340, and then returns to await and receive a response, at step 335.

Function 22 of system 13 receives the information, at step 414, and checks whether it indicates that the transfer of the moving subscriber's old mailbox 200 contents has been completed, at step 415. If the information does not indicate transfer completion but rather conveys more old mailbox 200 contents, function 22 performs certain checks on the information and attempts to enter it in the moving subscriber's new mailbox 200 that it created at step 411, at step 416. The performed checks are illustratively the same checks as would be performed in a manually-effected move under the conventional practice. Function 22 of system 13 then returns to step 412 to check the success of its actions. If all of the checks succeed and there is sufficient memory space available for entering the information into new mailbox 200, function 22 sends a positive acknowledgment to system 12, at step 413.

Function 22 of system 12 now repeats steps 335-340, and function 22 of system 13 repeats steps 414-416 and 412-413, until either all contents of moving subscriber's old mailbox 200 have been transferred to system 13 by system 12, as determined at step 337, or until some action of system 13 with respect to any of the received mailbox 200 contents fails, as determined at step 412.

If function 22 of system 13 determines a failure of any of its actions at step 412, it sends to system 12 a negative acknowledgment, at step 417. It then clears system 13 of any information on, or effects of, the attempted move that resulted from steps 410 and 411, at step 418, thereby aborting that subscriber's move to system 13. Function 22 of system 13 then proceeds to step 434 to await and receive indication from system 12 regarding whether there are more subscribers to be moved.

Function 22 of system 12 receives the acknowledgment at step 335, and determines that it is a negative acknowledgment at step 336. In response, it internally makes a note of the failure of the move of subscriber 25, at step 341, and unlocks the subscriber's old mailbox 200, at step 342, thereby aborting the subscriber's move from system 12 and restoring that subscriber 25 to being serviced by system 12. Function 22 then proceeds to step 360 to determine whether there are more subscribers to move.

If no failure is reported by system 13 and function 22 of system 12 determines that all contents of the moving subscriber's old mailbox 200 have been transferred to system 13, function 22 of system 12 retrieves an indication of whether the transfer is "forced" or "unforced" from the information it stored at step 304, at step 348. Function 22 then sends to system 13 the retrieved indication, plus a notice that transfer of all information for moving subscriber 25 from system 12 to system 13 has been completed, at step 349.

The message is received by function 22 of system 13 at step 414 and identified as a transfer completion notice at step 415. In response, function 22 of system 13 undertakes to perform translations on the contents of the moving user's new mailbox 200, at step 420. The translation activities performed by function 22 of system 13 are substantially the reverse of the activities performed by function 22 of system 12 at step 339: function 22 of system 13 searches the contents of the moving subscriber's new mailbox 200 for the occurrence of fields 242-244 (see FIG. 2) and uses translation table 201 of system 13 to substitute therefor the corresponding subscriber I.D. If no corresponding entry 240 exists in translation table 201, function 240 selects an unassigned subscriber I.D. and creates the corresponding entry 204 therefor in table 201.

If at some point the translations fail, as determined at step 421, function 22 checks the received "forced" move indication, at step 422, to determine if the move is "forced" or "unforced". If the move is "unforced", function 22 sends a negative acknowledgment to system 12 to inform it of the failure, at step 432. Function 22 then clears system 13 of any information on, or effects of, the attempted move, at step 433, thereby aborting that subscriber's move to system 13. Function 22 of system 13 then proceeds to step 434 to await and receive indication from system 12 regarding whether there are more subscribers to be moved.

If the move is "forced", function 22 of system 13 deletes whatever information it cannot translate, at step 425, and continues with the move.

Following successful completion of translations, at step 421, or the deletion of untranslatable information of a "forced" move, at step 425, function 22 of system 13 sends a positive acknowledgment to system 12 to inform it of translation completion, at step 430. Subscriber 25 is now moved to system 13, and function 22 of system 13 unlocks the subscriber's new mailbox 200, at step 431, to permit access thereto. Function 22 then proceeds to step 434 to await and receive indication from system 12 regarding whether there are more subscribers to be moved.

Function 22 of system 12 receives the response notifying it of the result of translations, at step 350, and it checks the response, at step 351, to determine if the move was a success or failure. If it failed, function 22 proceeds to steps 341 and 342 to note the failure and unlock the subscriber's old mailbox 200 to restore his or her service on system 12. If it was a success, function 22 internally notes the success, at step 352. Function 22 then deletes messages portion 211 (see FIG. 1) of the moved subscriber's old mailbox 200, at step 353. However, for the time being, function 22 retains subscriber profile portion 210 of the moved subscriber's old mailbox 200, to ensure that the subscriber I.D. of moved subscriber 25 on system 12 does not become unused and available for reassignment to another subscriber immediately, before other systems 14 of network 10 have been informed of the move. At this time, function 22 also creates a new translation, i.e., a new entry 240 in translation table 201, for the moved subscriber 25, in remote subscribers section 231, at step 354. Moved subscriber 25 now has two entries 240 in table 201: the original, pre-move, entry, and the new, post-move, entry. Optionally, function 22 may now "unlock" the moved subscriber's old mailbox 200, at step 355, in the sense of enabling system 12 to use the moved subscriber's two entries 240 to forward messages received for moved subscriber 25 on system 12 to system 13, at step 356. Function 22 of system 12 then proceeds to step 360 to determine whether there are more subscribers to be moved.

At step 360, function 22 of system 12 checks the information that it stored at step 304 to determine if there are more subscribers to be moved. If so, function 22 sends a notice to system 13 that there are subscribers to move, at step 361, and returns to step 330 to move the next subscriber.

Function 22 of system 13 receives the notice at step 434, determines therefrom at step 435 that more subscribers are to be moved, and returns to step 410 to await and receive information on the next moving subscriber.

When function 22 of system 12 determines at step 360 that there are no more subscribers to be moved, it sends a notice to that effect to system 13, at step 362. Function 22 of system 12 then causes the data connection that had been established at step 310 to system 13 to be torn down, at step 363. Using the notes that it had made at steps 352 and 341 regarding successful and failed moves, function 22 of system 12 issues a report to administrator 29 regarding which moves succeeded and which ones failed, at step 365.

References to moved subscriber 25 may exist in numerous places in the databases of systems 12 and 13. For example, lists 222 of one or more subscribers 25-26 served by system 12 or 13 may include moved subscriber 25 as a member, or the headers of messages sent by moved subscriber 25 to one of the other subscribers 26-28, or messages from one of the other subscribers 26-28 for moved subscriber 25 that are still extant in the other subscriber's mailbox 200, would identify moved subscriber 25. Any such references to moved subscriber 25 are in the form of the moved subscriber's old subscriber I.D.s—the ones he or she had on systems 12 and 13 while being served by system 12. These references are now incorrect, and must be translated to the moved subscriber's new subscriber I.D. on each system 12 and 13. But the process of looking through all possible records where such references may exist, in order to translate them, is time consuming; immediate performance of the translations might consume so much processing power of a system 12 or 13 as to interfere with its normal operation. Consequently, functions 22 of systems 12 and 13 schedule the translations to be performed as part of their systems' audits. Audits are generally performed at some time, such as late night hours, when a system is not busy. Function 22 of system 12 schedules translations at step 370. Function 22 of system 13 does so at step 436, in response to receiving, at step 434, the notice from system 12 informing it that there are not more subscribers to be moved, and identifying the notice as such, at step 435. Function 22 of system 13 then exits, at step 437.

Systems of network 10 other than system 12 and 13—system 14 in this illustrative example—may likewise contain references to moved subscriber 25, and hence must be notified of the move so that they can appropriately modify those references. To notify them, function 22 of system 12 causes data connections to be set up through network 10 to all of the other systems 14, at step 371, and then broadcasts a notice across those connections informing systems 14 of all successful moves, at step 372. The notice includes universal identifying information for each moved subscriber 25—fields 242-244 of the subscriber's new entry 240 of translation table 201. Function 22 of system 12 then causes the data connections to be torn down, at step 373, and exits, at step 374.

Each other system 14 receives the notice and in response invokes its function 22, at step 600. Moved subscribers 25 were and are remote to system 14 both before and after the move, so there is no need to change the moved subscriber's subscriber I.D. in system 14. It is only necessary to update the contents of translation table 201 remote subscribers portion 231 entry 240 for moved subscriber 25—if any such entry exists—to reflect the change in the system which is serving moved subscriber 25—no time-consuming database searches for references to moved subscriber 25 are required. Function 22 of system 14 receives the notice, at step 601, and immediately uses the information conveyed thereby to update its translation table 201 entries 240 for all moved subscribers 25, at step 602. Function 22 of system 14 then exits, at step 603.

When audits are run on systems 12 and 13, their respective functions 22 are invoked, at step 500. Upon its audit-time invocation, a function 22 checks whether there are old mailboxes 200 scheduled for deletion, at step 501. If not, function 22 retrieves identification of all subscribers 25 that were successfully moved to or from this system since the last audit-time invocation of function 22, at step 504. For each identified subscriber 25, function 22 causes database processor 23 to search the database of the system for the subscriber's old subscriber I.D., at step 505, and substitutes the subscriber's new I.D. for each occurrence of the old, at step 506. Then, for each subscriber 25 that has been moved to the system, function 22 also frees up the subscriber's old subscriber I.D., at step 507, by clearing fields 242–244 of entry 240 of remote subscribers portion 231 of translation table 201 that has the old subscriber I.D. in field 241. Function 22 also checks whether any of the identified moved subscribers 25 were subscribers 25 moved from the system, at step 508. If so, subscriber profile portions 210 of those subscribers' old mailboxes 200 are still present in the system, as was explained previously. Function 22 stores the identification of these subscribers 25, at step 509, and schedules deletion of the remainder of their old mailboxes 200 for the next time that audits are run on this system, at step 510. Function 22 then exits, at step 511.

Returning to step 501, if a function 22 finds there that it had scheduled old mailboxes 200 for deletion during the previous audits, function 22 retrieves, at step 502, the identification (stored at step 511) of moved subscribers 25 whose old mailboxes 200 are to be deleted, and uses it to identify and delete their old mailboxes 200, at step 503. Function 22 then continues operation at step 504.

Of course, it should be understood that various changes and modifications to the illustrative embodiment described above will be apparent to those skilled in the art. For example, an analog networking arrangement could be used instead of digital networking to effect the subscriber moves. Also, if the division of subscriber I.D.s into local and remote subscriber ranges were eliminated so that a subscriber could keep the same I.D. on a system upon moving to, or being moved from, the system, the audit-time translations on the source and destination systems would be much simplified; they would be reduced to the simple translation table updates now made on systems that are not directly involved in the move. Such changes and modifications can be made without departing from the spirit and the scope of the invention and without diminishing its attendant advantages. It is therefore intended that all such changes and modifications be covered by the following claims.

We claim:

1. An electronic message service network comprising:
    a plurality of electronic message service systems interconnected for communicating with each other, each system providing electronic messaging services to a plurality of different subscribers;
    first means in a first one of the systems responsive to receipt of information both identifying at least one of the subscribers served by the first system and identifying a second one of the systems, for automatically communicating from the first to the second system information required to serve the identified at least one subscriber, and ceasing to serve the identified at least one subscriber on the first system; and
    second means in the second system responsive to receipt of the communicated information, for automatically commencing to serve the identified at least one subscriber on the second system instead of the first system.

2. The network of claim 1 wherein
    the first means include means for automatically notifying other systems of the network that the second system has taken over serving the identified at least one subscriber.

3. The network of claim 1 wherein
    each system includes a plurality of subscriber mailboxes, one for each subscriber served by the system; wherein
    the first means include means for communicating contents of the mailbox of each said identified subscriber to the second system; and wherein
    the second means include means responsive to receipt of the contents of the mailbox of a subscriber, for establishing a mailbox for the subscriber on the second system and populating the established mailbox with the received contents.

4. The network of claim 3 wherein
    the mailbox contents include both a subscriber profile and subscriber messages, and wherein the first means in the first system communicate, and the second means in the second system populate the established mailbox with, both the profile and the messages.

5. The network of claim 1 wherein
    information required to serve a subscriber includes local information that is specific to the system that is serving the subscriber, and the network also includes corresponding universal information that is generic to the network; wherein
    the first means include
    means for automatically translating the local information required to serve the identified at least one subscriber into the corresponding universal information, and
    means for automatically communicating the translated information required to serve the identified at least one subscriber from the first to the second system; and wherein
    the second means include
    means responsive to receipt of the translated communicated information for translating the received universal information into the corresponding local information.

6. The network of claim 5 further including
    third means responsive to the second system commencing to serve the identified at least one subscriber, for modifying the universal information to reflect that the second system is now serving the identified at least one subscriber.

7. The network of claim 6 wherein each system includes universal information corresponding to local information included in the system; and wherein the third means include means in the first means and means in the second means responsive to the communication for automatically modifying the universal information included in the first and second systems, respectively, to reflect that the second system is serving the identified at least one subscriber.

8. The network of claim 7 wherein the first means include means for automatically notifying other systems of the network that the second system has taken over serving the identified at least one subscriber; and wherein the third means further include means in the other system responsive to receipt of the notification for automatically modifying the universal information included in each of the other systems to reflect that the second system is serving the identified at least one subscriber.

9. The network of claim 5 wherein the first means further communicate information to the second system indicating whether a move of the identified at least one subscriber for service from the first system to the second system is forced or unforced; and wherein the second means include means responsive to failure of the translating means to translate any received global information into the corresponding local information, for either (a) preventing the commencement of serving of the identified at least one subscriber on the second system, if the communicated indication indicates that the move is unforced, or (b) deleting global information which the translating means failed to translate and allowing commencement of serving of the identified at least one subscriber on the second system, if the communicated indication indicates that the move is forced.

10. An electronic message service system for use in an electronic message service network having a plurality of electronic message service systems interconnected for communicating with each other, each system providing electronic messaging services to a plurality of different subscribers, the system comprising:

first means responsive to receipt of information both identifying at least one of the subscribers served by this system and identifying another system, for automatically communicating from this system to the other system information required to serve the identified at least one subscriber in order to cause the other system to serve the identified at least one subscriber instead of this system; and second means responsive to receipt from another system of information required to serve at least one subscriber presently served by the other system, for automatically commencing to serve the at least one subscriber on this system instead of the other system.

11. The system of claim 10 wherein the first means include means for automatically notifying yet other systems of the network that the other system has taken over serving the identified at least one subscriber.

12. The system of claim 10 wherein each system includes a plurality of subscriber mailboxes, one for each subscriber served by the system; wherein the first means include means for communicating contents of the mailbox of each said identified subscriber to the other system; and wherein the second means include means responsive to receipt of contents of the mailbox of a subscriber, for establishing a mailbox for the subscriber on this system and populating the established mailbox with the received contents.

13. The system of claim 12 wherein mailbox contents include both a subscriber profile and subscriber messages, and wherein the first means communicate, and the second means populate the established mailbox with, both the profile and the messages.

14. The system of claim 10 wherein information required to serve a subscriber includes local information that is specific to the system that is serving the subscriber, and the system also has access to corresponding universal information that is generic to the network; wherein the first means include means for automatically translating the local information required to serve the identified at least one subscriber into the corresponding universal information, and means for automatically communicating the translated information required to serve the identified at least one subscriber to the other system; and wherein the second means include means responsive to receipt of translated communicated information for translating the received universal information into the corresponding local information.

15. The system of claim 14 further including third means responsive to a change in system that is serving the identified at least one subscriber, for modifying the universal information to reflect that a different system is now serving the identified at least one subscriber.

16. The system of claim 15 wherein the system includes universal information corresponding to local information included in the system; and wherein the third means include means in the first means responsive to the communication of the information, and means in the second means responsive to the receipt of information, each for automatically modifying the universal information included in the system to reflect that a different system is now serving the identified at least one subscriber.

17. The system of claim 16 wherein the first means include means for automatically notifying yet other systems of the network that the other system has taken over serving the identified at least one subscriber; and wherein the third means further include means responsive to receipt of a notification that another system has taken over serving an identified at least one subscriber, for automatically modifying the universal information included in the system to reflect that the other system is serving the identified at least one subscriber.

18. The system of claim 14 wherein
the first means further communicate information to the other system indicating whether a move of the identified at least one subscriber for service from this system to the other system is forced or unforced; and wherein
the second means include means responsive to failure of the translating means to translate any received universal information into the corresponding local information, for either (a) preventing the commencement of serving of the identified at least one subscriber on this system, if the communicated indication indicates that the move is unforced, or (b) deleting global information which the translating means failed to translate and allowing commencement of serving of the identified at least one subscriber on this system, if the communicated indication indicates that the move is forced.

19. A method of moving a subscriber of an electronic messaging service from a first electronic message service system to a second electronic message system in an electronic message service network having a plurality of the electronic message service systems interconnected for communicating with each other and each system providing the service to a plurality of different subscribers, comprising the steps of:
receiving in the first system information both identifying at least one of the subscribers served by the first system and identifying the second system;
automatically communicating from the first system to the second system information required to serve the identified at least one subscriber, in response to receipt of the identifying information;
receiving in the second system the communicated information; and
automatically commencing to serve the identified at least one subscriber on the second system instead of the first system, in response to receipt of the communicated information.

20. The method of claim 19 wherein
the step of communicating includes the step of automatically notifying other systems of the network that the second system has taken over serving the identified at least one subscriber.

21. The method of claim 19 in a network wherein each system includes a plurality of subscriber mailboxes, one for each subscriber served by the system; wherein
the step of communicating includes the step of communicating contents of the mailbox of each said identified subscriber to the second system; and wherein
the step of commencing includes the step of establishing a mailbox for a subscriber on the second system and populating the established mailbox with communicated contents of a mailbox of the subscriber, in response to receipt of the communicated contents.

22. The method of claim 21 in a network wherein mailbox contents include both a subscriber profile and subscriber messages; wherein
the step of communicating comprises the step of communicating both the profile and the messages contained in a mailbox; and wherein
the step of establishing and populating includes the step of populating the established mailbox with both of the communicated profile and messages.

23. The method of claim 19 in a network wherein information required to serve a subscriber includes local information that is specific to the system that is serving the subscriber, and the network also includes corresponding universal information that is generic to the network; wherein
the step of communicating includes the steps of
automatically translating the local information required to serve the identified at least one subscriber into the corresponding universal information, and
automatically communicating the translated information required to serve the identified at least one subscriber from the first to the second system; and wherein
the step of commencing includes the step of
translating received universal information into the corresponding local information, in response to receipt of the translated communicated information.

24. The method of claim 23 further including the step of
modifying the universal information to reflect that the second system is now serving the identified at least one subscriber, in response to the second system commencing to serve the identified at least one subscriber.

25. The method of claim 24 in a network wherein each system includes universal information corresponding to local information included in the system; wherein
the step of modifying includes the steps of
automatically modifying the universal information included in the first system to reflect that the second system is serving the identified at least one subscriber, in response to the communication, and
automatically modifying the universal information included in the second system to reflect that the second system is serving the identified at least one subscriber, in response to the communication.

26. The method of claim 25 wherein
the step of communicating includes the step of
automatically notifying other systems of the network that the second system has taken over serving the identified at least one subscriber; and wherein
the step of modifying further includes the steps of
automatically modifying the universal information included in each of the other systems to reflect that the second system is serving the identified at least one subscriber, in response to receipt of the notification.

27. A method of moving a subscriber of an electronic messaging service from a first electronic message service system to a second electronic message service system in an electronic message service network having a plurality of the electronic message service systems interconnected for communicating with each other and each system providing the service to a plurality of different subscribers, wherein information is required to serve a subscriber and includes local information that is specific to the system that is serving the subscriber and the network also includes corresponding universal information that is generic to the network, comprising the steps of:
receiving in the first system information both identifying at least one of the subscribers served by the first system and identifying the second system;
automatically communicating from the first system to the second system information required to serve the identified at least one subscriber, in response to receipt of the identifying information, including the steps of automatically translating the local information required to serve the identified at least one subscriber into the corresponding universal information, automatically communicating the translated information required to serve the identified at least one subscriber from the first to the second system, and communicating information to the second system indicating whether a move of the at least one subscriber for service from the first system to the second system is forced or unforced;

receiving in the second system the communicated information;

translating received universal information into the corresponding local information, in response to receipt of the communicated information;

automatically commencing to serve the identified at least one subscriber on the second system instead of the first system, responsive to success of translation of the received universal information into the corresponding local information;

preventing the commencement of serving of the identified at least one subscriber on the second system, responsive to failure of the translation of the received universal information into the corresponding local information and a communicated indication that the move is unforced; and deleting universal information which the translating means failed to translate and commencing to serve the identified at least one subscriber on the second system instead of the first system, responsive to failure of the translation of the received universal information into the corresponding local information and a communicated indication that the move is forced.

* * * * *